United States Patent [19]

Vehe et al.

[11] 4,193,356

[45] Mar. 18, 1980

[54] SPRAY MONITORING DEVICE AND IMPLEMENT

[75] Inventors: Dennis Vehe; Pieter van den Berg, both of Wilson, N.C.

[73] Assignee: The Lely Corporation, Wilson, N.C.

[21] Appl. No.: 871,137

[22] Filed: Jan. 20, 1978

[51] Int. Cl.² ............................ A01C 23/02; B05B 17/00
[52] U.S. Cl. ........................................ 111/6; 239/74; 340/608; 111/1
[58] Field of Search ............ 111/1, 6, 51; 137/558; 239/70–72, 63, 74; 340/239 R, 239 S; 222/23, 39–40

[56] References Cited

U.S. PATENT DOCUMENTS

| | | | |
|---|---|---|---|
| 3,265,099 | 8/1966 | Severino et al. | 137/558 X |
| 3,422,776 | 1/1969 | Gregory | 111/51 |
| 3,493,951 | 2/1970 | Hartka et al. | 340/239 R |
| 3,991,939 | 11/1976 | Maclay | 239/63 |
| 4,023,507 | 5/1977 | van der Lely | 111/6 |
| 4,084,748 | 4/1978 | Anderson | 239/74 |

Primary Examiner—Robert E. Bagwill
Attorney, Agent, or Firm—Mason, Mason and Albright

[57] ABSTRACT

An agricultural implement, such as a cultivator or harrow has fluid sprayers mounted on a boom extending across the implement's width. Adjacent each sprayer, a monitoring device is positioned to signal if the sprayers malfunction. The monitoring device includes a dielectric housing having an upper holder for a wire probe and a detachable lower cover that is hollow and has an open lower end. The cover has an inner chamber and an external skirt. The probe extends through the chamber and out of the lower end to a location near the outer edge of the spraying pattern. It is preferred that the lower portion of the probe be curved and extend in the direction of the fluid being sprayed. Each probe communicates to a respective light mounted on a control box located within the view or supervision of the implement operator so that any malfunction of a sprayer is immediately sensed.

5 Claims, 8 Drawing Figures

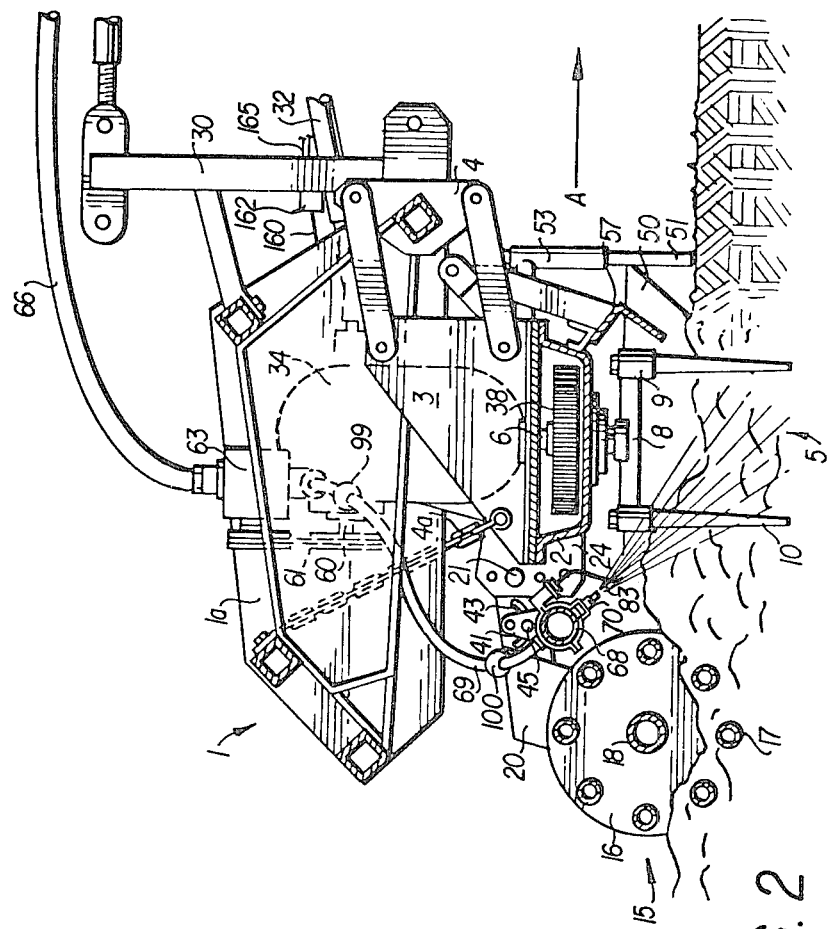
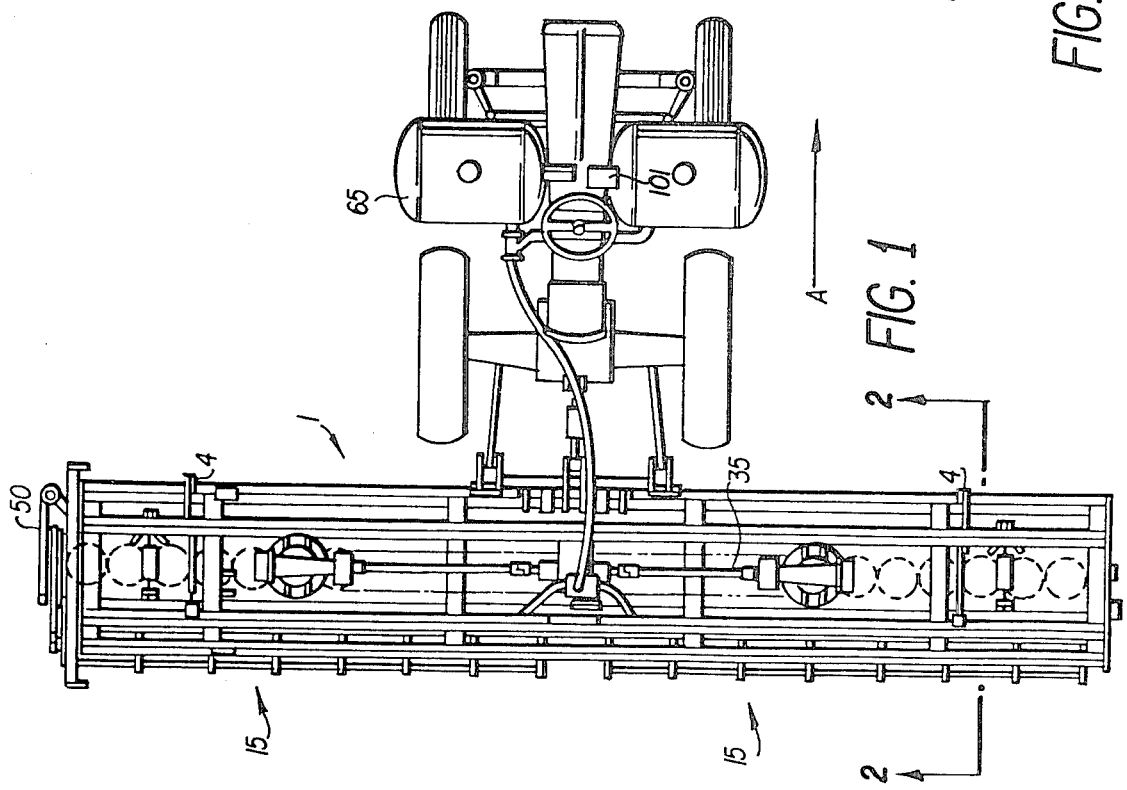
FIG. 1
FIG. 2

SPRAY MONITORING DEVICE AND IMPLEMENT

Copending Ser. No. 828,745, filed Aug. 20, 1977, describes spraying methods and an implement with spray boom wherein a rotary cultivator or harrow has an elongated spray boom for fluids, particularly liquids, with nozzles that spray fluid adjacent soil being worked by the tines of driven rotors. U.S. Pat. No. 4,023,507 discloses a similar structure with various monitors that signal when the spray nozzles malfunction.

The present application relates to an improved monitoring system for sprayers, preferably fluid sprayers used in environments similar to those disclosed in the above application and patent.

IN THE DRAWINGS

FIG. 1 is a plan view of a harrow implement to which sprayers are attached;

FIG. 2 is a side elevation of the implement with spray monitor devices;

Figure 3:
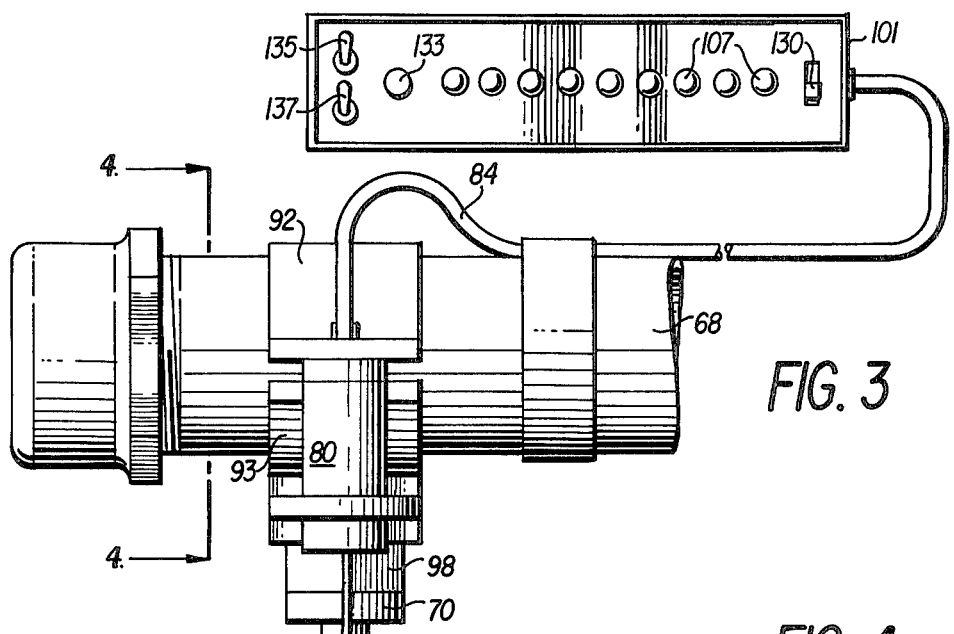
FIG. 3 is a rear elevation of the spray boom showing sprayer and a monitor device.

The rotary harrow of the present invention has a supporting structure 1 of frame beams that extend transverse to the direction of travel A and are interconnected to one another by tie supports 1a. The structure 1 supports one or more hollow box frame portions 2 of each of which mounts a row of tined rotors 5. Parallelogram linkages 4 interconnect one of the beams to upright supports 3 secured at the top of each portion 2 to allow relative movement of that portion with respect to the remainder of the implement. One or more chains 4a are interconnected to the supports 3 and supporting structure 1 to limit the downward movement of the portion 2 relative to the structure 1 when the structure 1 is raised for transport.

The rotors 5 are mounted in a transverse row for rotation about upwardly extending axes defined by shafts 6 which are spaced apart from one another by about 25 centimeters. Each rotor 5 has a support 8 with a holder 9 at each opposite end and neighboring rotors are offset from one another and rotated in opposite directions. An elongated tine 10 is held in each holder 9 and soil working portions of the tines 10 extend down from their holders 9, about 5-8 inches preferably in trailing positions, relative to their normal directions of rotation.

The frame portions 2 can have two identical sections, each of which has a corresponding supporting rear roller 15 on arms 20 and support plates 16 that mount elongated elements 17. Each roller 15 is journalled to the two side arms 20. The arms 20 can be set in any chosen position by a locking pin 21 that is passed through matching holes in the arms 20 and end plates 24 for the frame portion sections.

The front of structure 1 has a coupling member 30 that can be fastened to the three-point lift of a conventional tractor and drive to the rotors 5 is effected via a telescope shaft 32 from the p.t.o. of the tractor to an imput shaft at the front side of a central gear box 34. Respective drive shafts 35 and universal joints are mounted on each section of the frame portion 2 and engage gear boxes 37 that house gears to rotate extensions of one of the shafts 6. Since the pinions 38 of neighboring rotors 5 are in mesh, each rotor is driven in an opposite direction from its neighboring rotor or rotors and the rotors can be considered to be mounted in pairs which revolve their respective tines towards a rear area between that pair.

The above transmission is described in U.S. Pat. No. 3,885,633. Also, side shields 50 are mounted on telescope rods 51 that are slideably and turnably held in sleeves 53 at each side of the row of rotors 5. A forward guard 57 is pivoted to the front of each frame portion for the same purposes as described in U.S. Pat. No. 3,885,633.

At the rear of the gear box 34, an output shaft 60 drives a belt and pulley arrangement which operates pump 63 and fluid is pumped from tanks 65 through hoses 66 and 69 to a respective spray boom 68 that extends across the rear of each frame portion 2. Each boom 68 is adjustably secured to the two arms 20 and this is preferred because the portions 2 "float" with linkages 4 interconnecting the portions to structure 1. Other structures such as a single or more than two spray booms can be connected to the frame portions 2 and only one frame portion need be provided, but in any case, each boom can be turned about its longitudinal axis and can be raised or lowered with respect to the row of rotors 5. Each end of spray boom 68 has an upright flange 41 with a threaded stud 43 that is fitted in slot 45 of each arm 20. By rotating the boom 68 and/or moving same in the slots 45, the positions of the nozzles 70 relative to the rotors 5 can be changed and set with fasteners threaded on the studs 43. The nozzles and/or booms can be moved forwardly or rearwardly relative to the rotors. Also, the nozzles can be pointed down to spray chemicals for shallow applications.

The monitoring device 80 includes an upper holder 82 of dielectric material and a lower cover 88, also preferably of dielectric material. An insulated wire 84 from a power source, monitoring box 101, leads to a connection to elongated probe 83 which is preferably a wire of corrosion resistant material. The holder has a side extension with a fastening aperture 85 and a lower screw-threaded extension 86.

Figure 4:
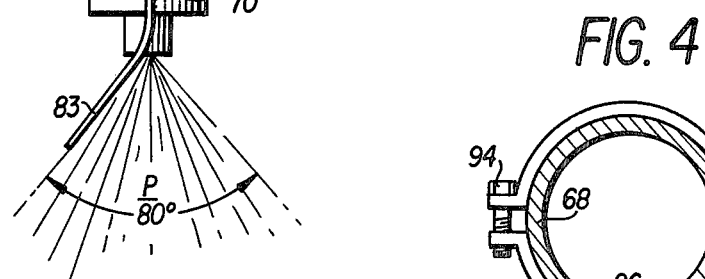
FIG. 4 is a section taken along the lines 4—4 of FIG. 3.
Figure 5:
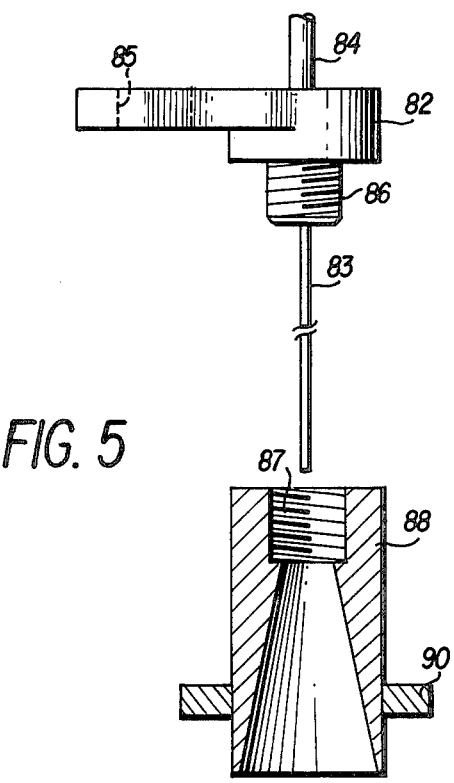
FIG. 5 is an exploded view of the device.

The lower cover 88 has an upper threaded opening that releaseably engages extension 86. Cover 88 is hollow and has an inner chamber through which probe 83 extends out the lower open end of cover 88. A skirt 90 encircles the cover 88 intermediate the opposite ends of the cover. As seen in FIG. 4, a two-sectioned clamp 92 and 93 has threaded bolts 94 that draw sections 92 and 93 together, the lower section 93 being secured to nozzle 70 bolted to threaded pipe 96, between nuts 97 and 98. One of the bolts 94 is passed through aperture 85 and the device 80 is secured to boom 68 at the front side of the sprayers with respect to the direction of implement travel.

Alternatively, the devices 80 could be positioned at the rear of their respective sprayers, but in either instance, the probe 83 should be bent so that its lower portion extends towards the edge of the spray pattern P as shown in FIGS. 3 and 4. It is preferred that the spray pattern P be fan-shaped or cone transverse to the direction of travel and probe 83 extend to an outer edge of the pattern and downwardly in the direction of fluid spray.

The device 80 can be mounted closely adjacent a respective nozzle 70 and electrode probe 83 accurately positioned to cause little or no disruption to the spray pattern. Thus, the probe 83 is not fastened to the boom 68 or implement frame and there is no short circuiting. Thus, when some liquids are sprayed, a fine mist is generated that can ground a probe to the frame or other ground.

The skirt 90 reduces mist particle flow and the "dead" air in the chamber within cover 88 also impedes particle flow, particularly since the chamber 90 is tapered to have an enlarged lower open end. Thus, there is little opportunity for the housing of device 80 to become wet along a continuous path from the open end of cover 88 to ground.

The probe 83 can advantageously be curved and to the outer edge of the normal spray pattern because if the pattern is diminished, the break or completion of the circuit will be signalled. If desired, more than one probe for each nozzle 70 can be employed, one at each lateral side of a spray pattern for instance.

Figure 6:
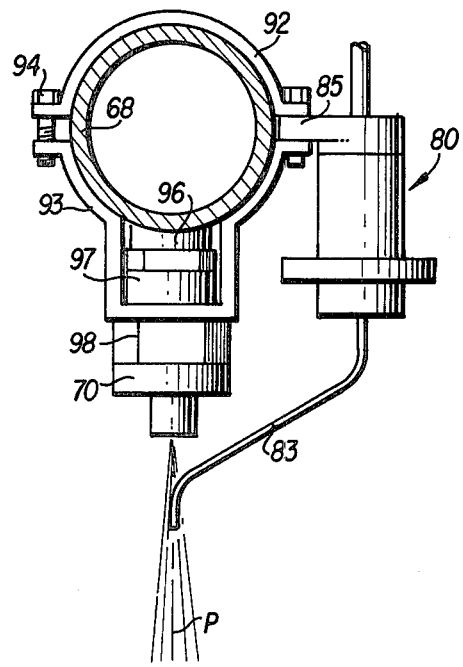
FIG. 6 is a diagrammatic view of the fluid circuit and switches.

In FIG. 6, centrifugal pump 63 draws fluid from the bottom of tank 65 via line 66 and pumps fluid through pressure regulator valve 99 in line 69. An agitator branch line 69a leads back to the tank from a T in line 69 downstream from pump 63. The other branch line 69b supplies fluid to boom 68 through boom valve 100. Both valves, 99 and 100, are controlled remotely from the monitor box 101.

Figure 8:
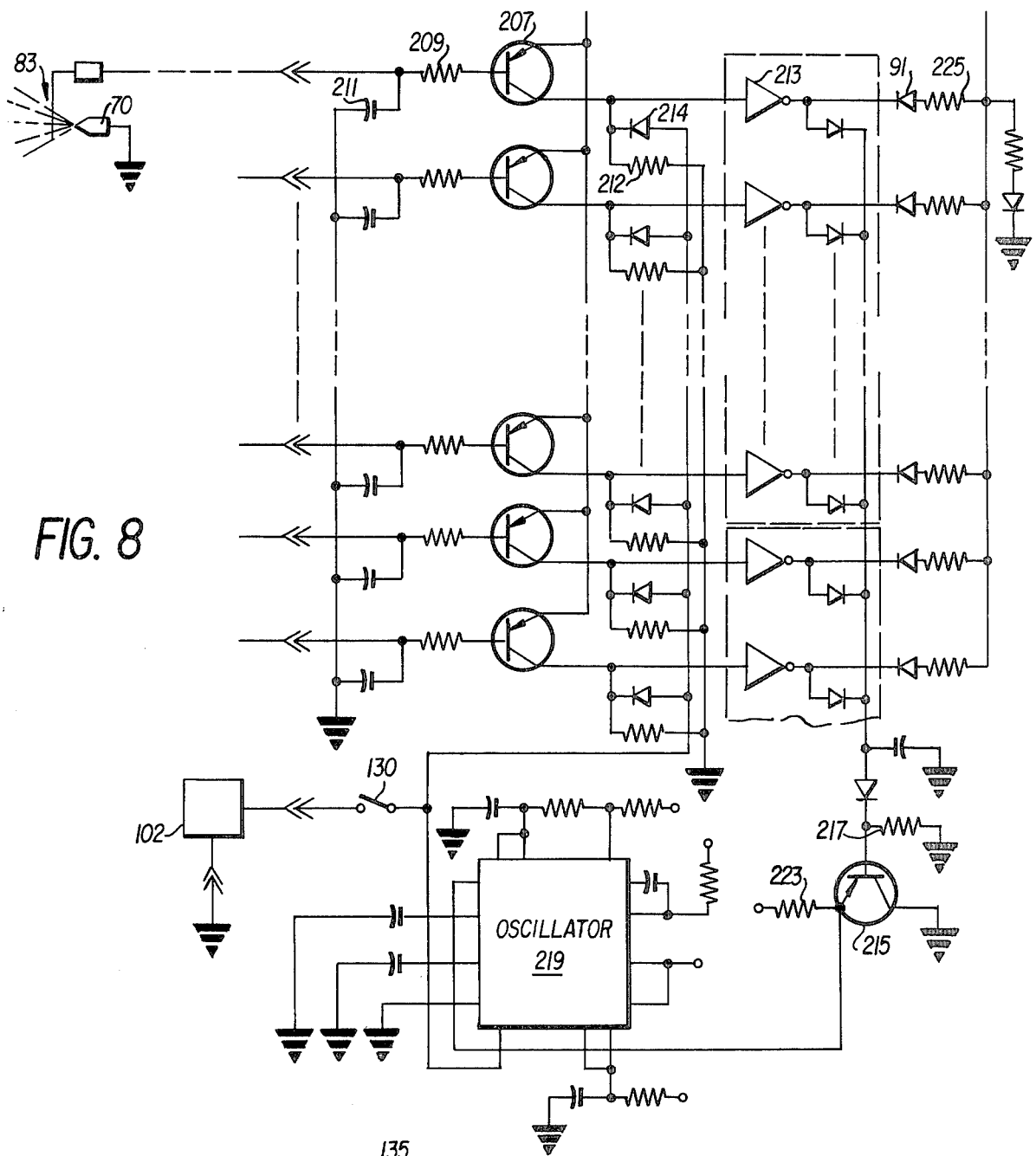
FIG. 8 is a circuit diagram of the monitoring system.
Figure 7:
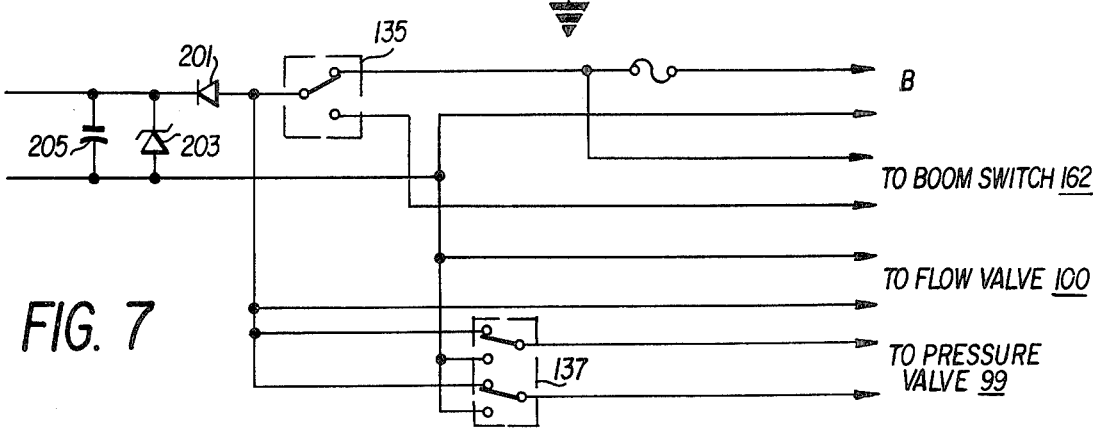
FIG. 7 is a circuit diagram of the switches.

In FIGS. 7 and 8, probe 83 in the spray pattern of nozzle 70 completes the respective circuit for the signal light 91 in row 107 in monitor box 101. Since there are nine nozzles 70 with corresponding probes mounted along the length of the boom 68, and all are identical, only one need be described and several of the respective circuits for lights 91 are omitted from FIG. 8. Leads from a 12-volt battery B to box 101 establish current for on-off power switch 133, on-off automatic boom switch 135 and pressure switch 137 that controls the position of pressure valve 99.

Pressure switch 137 is, in effect, a small motor that turns butterfly valve 99 about a pivot axis in either direction to set same more or less open in line 66. Valve 99 is a pressure regulator valve that can be operated remotely by the operator having box 101 mounted near the driver station.

With power switch 133 and boom switch 135 on, power is supplied to open the boom flow valve 100, which is a conventional solenoid valve in line 66. Power is also supplied to the sensor probes 83 through respective connections in box 101. If there is no flow or fluid to complete the circuit for lamp 91, the latter will blink off and on and audio "beep" alarm 102 will sound in cadence. When switch 135 is off, all functions of the monitor system are interrupted. When switch 135 is set on automatic, the system functions just as in the on position, unless boom 68 is raised to trip safety switch 162 that will interrupt the current just as when switch 135 is in the off position.

Pressure switch 137 is a three-position, spring-loaded switch that can be moved to increase position and turn butterfly pressure valve 134 in one direction. When moved to decrease, polarity is reversed and valve 134 is turned in the opposite direction.

Lamp 91 is lit and remains steady so long as fluid spray from nozzle 70 grounds the circuit. The imput from battery B is conditioned by rectifier 201 to protect against reverse polarity connection. Zenner diode 203 clips voltage transients to 15 volts to prevent damage and capacitor 205 acts to filter other transients.

Probe 83 gives about 100 K resistance to ground when the fluid spray is operative. Then, sufficient current is drawn from the base of transistor 207 through resistor 209 to bias transistor 207 to the on state. Capacitor 211 integrates the signal from probe 83 to slow the response of the circuit and allow very short spray interruptions to pass without triggering the circuit.

When on, transistor 207 supplies current through its collector to imput of lamp driver diode 213 that lights lamp 91. Lamp 91 provides a visual indication that the spray nozzle 83 is functioning correctly. Then, the internal diode of 213 is reversed biased and off and transistor 215 is biased on by resistor 217. When transistor 215 is on, the reset of the oscillator 219 is held in its reset position allowing no pulses to be produced in its output. So long as the power is on and nozzle 70 functions correctly, the lamp 91 will be on and audio signal alarm 102 will not signal.

Upon spray interruption, the circuit to ground through probe 83 is broken and current is no longer drawn from the base of transistor 207 which turns off. Then, no current is supplied to diode 213 and any leakage from transistor 207 grounds via resistor 212. With no current being supplied to diode 213, lamp 91 is off and the internal diode of 213 is biased to switch voltage through resistor 225 to the base of transistor 215, which base is reverse biased to turn transistor 215 off. The reset on oscillator 219 is pulled up to plus supply via resistor 223 allowing the oscillator to output a pulse which produces an alarm beep from alarm 102 and, through diode 214, supply current to lamp 91 for each pulse. With lamp 91 on, transistor 215 is then biased back on, holding the reset for oscillator 219 until the pulse times out. When the pulse times out, the current for lamp 91 is cut and the cycle is repeated to blink the lamp 91 in cadence with audio alarm 102. Switch 103 can be used to stop the audio alarm beeps.

The automatic boom switch setting on switch 135 is intended to shut off the flow of fluid to boom 68 responsive to the lifting of the implement by the tractor's lifting hitch. A pivotal arm 160 projects from remote micro switch 162 that is mounted on coupling member 30. Arm 160 projects rearwardly so that it is contacted and pivoted by some part of the implement frame structure 1 when the latter is displaced from operative position. In neutral position of arm 160, the current to boom valve 100 is on and the valve is open. Pivoting the arm 160 up or down results in automatically breaking the circuit to valve 100.

Although specific embodiments and structures have been set forth above, it is to be understood that no limitation to these specific embodiments and structures is intended, except as specifically indicated in the claims herein.

What is claimed is:

1. A spray monitoring device for use on an agricultural implement that includes at least one fluid sprayer supported by the implement frame, comprising an electrode sensor probe in a housing and means mounting the probe on the implement adjacent a spray outlet and the intended pattern of material to be sprayed, said housing including a dielectric holder for said probe and a cover with an internal flared chamber being a lower open end, said probe being an elongated conductor that is supported by said holder and connectable to an electrical signal having a power source, said probe extending from the holder through said chamber and out of the open end to the edge of the spraying pattern, a substantial distance away from said open end, said chamber tapering upwardly from said open end.

2. The device of claim 1, wherein an external skirt surrounds said cover, intermediate the ends thereof.

3. The device of claim 1, wherein said cover is detachably connected to the holder and said holder has a fastener that supports the entire housing.

4. The device of claim 3, wherein the upper end has a threaded opening and said probe is supported in the housing solely by said holder.

5. An agricultural implement comprising a frame mounting soil working means, a supporting roller to the rear of said soil working means and at least one fluid sprayer supported on said frame, said sprayer being positioned to spray a pattern of material in the vicinity of soil being worked and a spray monitoring device comprising at least one elongated electrode probe positioned adjacent said sprayer, said probe being supported in a housing and the latter including a dielectric holder for the probe, said probe extending out of a lower end of the housing to the intended pattern of sprayed material, said probe being in electrical communication with a source of power and a lamp, said sprayer including nozzle means supported by the frame, signal means responsive to the intended sprayed pattern contacting the probe and grounding said source of power to light said lamp, said sprayer comprising a boom in fluid communication with a liquid under pressure in a circuit and a remotely controlled valve in said circuit regulating the pressure of the liquid, a control panel of said device housing said lamp and a switch to said valve; a further valve in the circuit downstream from said first mentioned valve, said further valve being a solenoid valve that opens or closes the circuit responsive to switch means housed in said panel; displaceable sensor means positioned adjacent said frame and said sensor means communicating with said switch means, said sensor means being displaceable by movements of the frame and said further valve being moved through said switch means to close said circuit responsive to the displacement of the sensor means.

* * * * *